(12) United States Patent
Leboucher et al.

(10) Patent No.: US 6,475,974 B1
(45) Date of Patent: Nov. 5, 2002

(54) MECHANICAL MICROEMULSIONS OF BLENDED SILICONES

(75) Inventors: Marie-Agnes Leboucher, Braine-l'Alleud (BE); Joanna Newton, Genval (BE); Linda Denise Kennan, Midland, MI (US)

(73) Assignees: Dow Corning Corporation, Midland, MI (US); Dow Corning S.A., Seneffe (BE)

( * ) Notice: Subject to any disclaimer, the term of this patent is extended or adjusted under 35 U.S.C. 154(b) by 166 days.

(21) Appl. No.: 09/654,071

(22) Filed: Sep. 1, 2000

(51) Int. Cl.$^7$ .............................. C11D 9/32; C11D 1/86
(52) U.S. Cl. ................ 510/417; 510/466; 516/55; 424/70.122; 424/78.03; 424/401; 106/287.1; 524/837
(58) Field of Search ................ 510/224, 445, 510/433, 272, 305, 417, 466; 516/55; 424/401, 70.122, 78.03; 106/287.1; 524/837

(56) References Cited

U.S. PATENT DOCUMENTS

| 4,246,029 | A | | 1/1981 | Sanders, Jr. ............. 106/3 |
| 4,620,878 | A | * | 11/1986 | Gee |
| 5,244,598 | A | * | 9/1993 | Merrifield et al. |
| 5,338,352 | A | * | 8/1994 | Breneman et al. |
| 5,518,716 | A | | 5/1996 | Riccio et al. ............ 424/70.1 |
| 6,087,317 | A | | 7/2000 | Gee ........................ 510/417 |

FOREIGN PATENT DOCUMENTS

| DE | 0417047 A2 | 3/1991 | ........ D06M/15/643 |
| DE | 0646618 A1 | 4/1995 | .............. C08J/3/03 |
| DE | 0978586 A2 | 2/2000 | ........ D06M/15/643 |
| JP | 0268982 A2 | 6/1988 | ............ A61K/7/06 |
| JP | 0291213 A2 | 11/1988 | ........... C08G/77/06 |

* cited by examiner

Primary Examiner—Gregory E. Webb
(74) Attorney, Agent, or Firm—Jim L. De Cesare

(57) ABSTRACT

A microemulsion is formed by combining (a) water, (b) a nonionic surfactant, a cationic surfactant, an anionic surfactant, or a mixture of such surfactants, (c) a linear non-volatile polysiloxane, (d) an amine functional polysiloxane, and (e) a carboxylic acid. The mixture is mechanically agitated until a microemulsion is obtained containing polysiloxane particles having an average diameter of less than 50 nanometer (0.05 micron/500 angstrom Å). These microemulsions are useful in paper coating, textile coating, and home care applications. They can also be used to deliver silicone polymers of tailored rheological properties to the human body.

5 Claims, No Drawings

MECHANICAL MICROEMULSIONS OF BLENDED SILICONES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to microemulsions containing a blend of silicones constituted by (i) a silicone oil component and (ii) an amine functional polysiloxane component. In particular, silicone oil component (i) of the blend is a linear rather than cyclic siloxane.

BACKGROUND OF THE INVENTION

It is generally not known to microemulsify linear polydimethylsiloxanes. While U.S. Pat. No. 4,246,029 (Jan. 20, 1981) teaches that polydimethylsiloxanes can be emulsified when combined with an amine functional polysiloxane, the compositions are not microemulsions. Microemulsions, however, are described in U.S. Pat. No. 5,518,716 (May 21, 1996), but the mixture of silicones in the '716 patent is limited to cyclic siloxanes represented by the formula

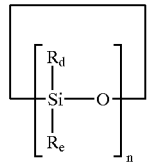

in which n is defined as being an integer varying from between about 3 to about 7, and $R_d$ and $R_e$ are alkyl radicals containing from 1 to 4 carbon atoms. The '716 patent, for example, refers specifically to the cyclic siloxane octamethycyclotetrasiloxane as being representative.

In contrast, microemulsions according to this invention contain linear polysiloxanes generally conforming to the formula

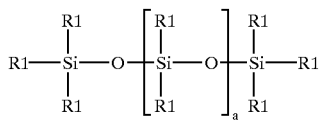

which is described in more detail hereafter.

BRIEF SUMMARY OF THE INVENTION

This invention relates to a microemulsion and to a method of making microemulsions. According to the method, a mixture is formed by combining (a) water, (b) a nonionic surfactant, a cationic surfactant, an anionic surfactant, or a mixture of such surfactants, (c) a linear:non-volatile polysiloxane, (d) an amine functional polysiloxane, and (e) a carboxylic acid, and the mixture is mechanically agitated until a microemulsion is obtained containing polysiloxane particles having an average diameter of less than 50 nanometer (0.05 micron/500 angstrom Å). The linear non-volatile polysiloxane (c) is a composition of the formula:

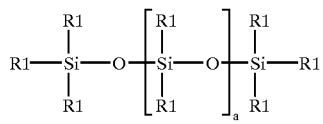

where R1 is an alkyl group containing 1–6 carbon atoms, preferably methyl, and a represents an integer having a value greater than 5 and less than about 400.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

As used herein, the term microemulsion means a single or one phase clear, thermodynamically stable, mixture of two or more immiscible liquids and one or more surfactant(s). It includes transparent compositions containing water, oil, and surfactant(s), including compositions which are transparent by virtue of a very small particle size. Microemulsions are generally always clear or transparent because they contain particles smaller than the wavelength of visible light.

The microemulsion may contain oil droplets dispersed in water (O/W), water droplets dispersed in oil (W/O), or it may have a bicontinuous structure. It can be recognized by several inherent characteristics which are (i) that it contains oil, water, and a surfactant; (ii) the system is optically clear or transparent; (iii) the phases do not separate by centrifugation; and (iv) it is a system which is generally stable indefinitely.

For purposes of this invention, therefore, a microemulsion is considered as being a clear or transparent composition which contains particles having an average diameter of less than 50 nanometer (0.05 micron/500 angstrom Å), preferably less than 40 nanometer (0.04 micron/400 angstrom Å), and most preferably less than 20 nanometer (0.02 micron/200 angstrom Å).

The blend used in forming microemulsions according to the invention is constituted by a silicone oil component and an amine functional polysiloxane component.

The silicone oil component of the blend is a polysiloxane composition, preferably a polydialkylsiloxane, and more preferably a nonvolatile linear polydimethylsiloxane. Such polysiloxanes conform generally to the formula:

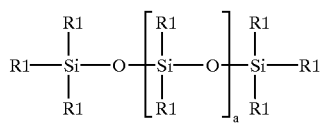

where R1 is an alkyl group containing 1–6 carbon atoms, most preferably a methyl group, and a has a value generally greater than 5 and less than about 400. The viscosity of such polysiloxanes generally ranges from about 5 centistoke (mm²/s) to about 1,000 centistoke (mm²/s), and such polysiloxanes have boiling points generally in excess of about 300° C. Some representative examples of polysiloxanes preferred for use according to this invention are polydimethylsiloxanes having a viscosity of 5, 10, 350, and 1,000 centistoke (mm²/s), in which case, the value of a in the above formula is about 8, 15, 180, and 375, respectively.

The amine functional polysiloxane component of the blend is a silicone fluid with highly polar pendant aminoalkyl modifying groups. Particularly preferred amine functional polysiloxanes include reactive and non-reactive hydrolyzable and non-hydrolyzable derivatives which are wholly, or in part, terminally substituted with aminopropyl, aminobutyl, or diamino pendant chains.

The amine functional polysiloxane employed in blends in accordance with the present invention has the formula:

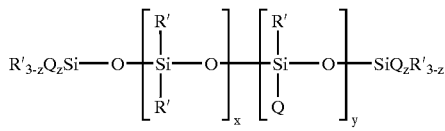

wherein R' denotes an alkyl group of 1 to 4 carbons or a phenyl group with the proviso that at least 50 percent of the total number of R' groups are methyl; Q denotes an amine functional substituent of the formula —R"Z wherein R" is a divalent alkylene radical of 3 to 6 carbon atoms and Z is a monovalent radical selected from the group consisting of —NR$_2$''', and —NR''' (CH$_2$)$_b$NR$_2$'''; wherein R''' denotes hydrogen or an alkyl group of 1 to 4 carbons, and b is a positive integer having a value of from 2 to 6; z has a value of 0 or 1; x has an average value of 25 to 3000; y has an average value of 0 to 100 when z is 1, y has an average value of 1 to 100 when z is 0; with the proviso that in all cases y has an average value that is not greater than one tenth the average value of x.

Suitable R' groups are represented by and may be independently selected from among methyl, ethyl, propyl, isopropyl, butyl, isobutyl, and phenyl, with the proviso that at least fifty percent of the R' groups are methyl.

The alkylene radicals represented by R" may include trimethylene, tetramethylene, pentamethylene, —CH$_2$CHCH$_3$CH$_2$—, and —CH$_2$CH$_2$CHCH$_3$CH$_2$—. Siloxanes where R" is a trimethylene or an alkyl substituted trimethylene radical such as —CH$_2$CH(CH$_3$)CH$_2$—, are preferred.

Alkyl groups of 1 to 4 carbon atoms as represented by R''' include methyl, ethyl, propyl, isopropyl, butyl, and isobutyl.

Useful Z radicals include the unsubstituted amine radical —NH$_2$, alkyl substituted amine radicals such as —NHCH$_3$, —NHCH$_2$CH$_2$CH$_2$CH$_3$, and —N(CH$_2$CH$_3$)$_2$; and aminoalkyl substituted amine radicals such as —NHCH$_2$CH$_2$NH$_2$, —NH(CH$_2$)$_6$NH$_2$, and —NHCH$_2$CH$_2$CH$_2$N(CH$_3$)$_2$.

When z is zero, the silicone polymer has only pendent amine functional substituents in the polymer chain. When z is one, the silicone polymer may have only terminal amine functional substituents or both terminal and pendent amine functional substituents in the polymer chain. Preferably, x may vary from a value of 25 to 500, and y may vary from zero to 100 when z is one and from one to 100 when z is zero. Most preferably, the value of x+y is in the range of about 50 to 1,000.

The amine content, i.e., the number of amine functional groups in the molecule of the amine functional polysiloxane, is generally expressed as mol percent amine, and this is determined according to the relationship y/DP×100, where y is the value of integer y in the above formula for the amine functional polysiloxane, and the Degree of Polymerization (DP) is x+y+2 which indicates the chain length of the amine functional polysiloxane.

For example, and with reference to the particular amine functional polysiloxane used in the examples, the amine functional polysiloxane was a trimethylsiloxy terminated dimethyl/methylaminoethylaminoisobutyl siloxane copolymer with a viscosity of about 3,000 centistoke (mm²/s), a DP of about 485, with a mol percent amine content of about 2.3 mol percent of aminoethylaminoisobutyl groups.

Such amine functional polysiloxanes are well known in the art and available commercially from sources such as the Dow Corning Corporation, Midland, Mich. USA.

The surfactant can be a nonionic, cationic, anionic, or a mixture of such surfactants. Most preferred are nonionic surfactants. The nonionic surfactant should be a non-silicon atom containing nonionic emulsifier. Most preferred are alcohol ethoxylates R2—(OCH$_2$CH$_2$)$_c$OH, most particularly fatty alcohol ethoxylates. Fatty alcohol ethoxylates typically contain the characteristic group —(OCH$_2$CH$_2$)$_c$OH which is attached to fatty hydrocarbon residue R2 which contains about eight to about twenty carbon atoms, such as lauryl (C$_{12}$), cetyl (C$_{16}$) and stearyl (C$_{18}$). While the value of "c" may range from 1 to about 100, its value is typically in the range of 2 to 40.

Some examples of suitable nonionic surfactants are polyoxyethylene (4) lauryl ether, polyoxyethylene (5) lauryl ether, polyoxyethylene (23) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, and polyoxyethylene (10) oleyl ether. These and other fatty alcohol ethoxylates are commercially available under names such as ALFONIC®, BRIJ, GENAPOL®, LUTENSOL, NEODOL®, RENEX, SOFTANOL, SURFONIC®, TERGITOL®, TRYCOL, and VOLPO.

Cationic surfactants useful in the invention include compounds containing quaternary ammonium hydrophilic moieties in the molecule which are positively charged, such as quaternary ammonium salts represented by R3R4R5R6N$^+$ X$^-$ where R3 to R6 are alkyl groups containing 1–30 carbon atoms, or alkyl groups derived from tallow, coconut oil, or soy; and X is halogen such as chlorine or bromine, or X can be a methosulfate group. Most preferred are dialkyldimethyl ammonium salts represented by R7R8N$^+$(CH$_3$)$_2$X$^-$, where R7 and R8 are alkyl groups containing 12–30 carbon atoms, or alkyl groups derived from tallow, coconut oil, or soy; and X is halogen or a methosulfate group. Monoalkyltrimethyl ammonium salts can also be employed, and are represented by R9N$^+$(CH$_3$)$_3$X$^-$ where R9 is an alkyl group containing 12–30 carbon atoms, or an alkyl group derived from tallow, coconut oil, or soy; and X is halogen or a methosulfate group.

Representative quaternary ammonium salts are dodecyltrimethyl ammonium bromide (DTAB), didodecyldimethyl ammonium bromide, dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium chloride, and ditallowdimethyl ammonium bromide. These and other quaternary ammonium salts are commercially available under names such as ADOGEN, ARQUAD, SERVAMINE, TOMAH, and VARIQUAT.

Examples of anionic surfactants include sulfonic acids and their salt derivatives; alkali metal sulfosuccinates; sulfonated glyceryl esters of fatty acids such as sulfonated monoglycerides of coconut oil acids; salts of sulfonated monovalent alcohol esters such as sodium oleyl isothionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates such as sodium lauryl (dodecyl) sulfate (SDS); ether sulfates having alkyl groups of eight or more carbon atoms; and alkylaryl sulfonates having one or more alkyl groups of eight or more carbon atoms.

Commercial anionic surfactants useful in this invention include triethanolamine linear alkyl sulfonate sold under the name BIo-SOFT N-300 by the Stepan Company, Northfield, Ill.; sulfates sold under the name POLYSTEP by the Stepan Company; and sodium n-hexadecyl diphenyloxide disulfonate sold under the name DOWFAX 8390 by The Dow Chemical Company, Midland, Mich.

A carboxylic acid can be included as a component for reducing interfacial tension, which in turn facilitates a reduction in particle size from 150 nanometer to 10 nanometer. Such carboxylic acids generally have the formula $CH_3(CH_2)_d COOH$ where d can be zero or a positive integer from 1 to about 18. Some examples of useful carboxylic acids are acetic acid, propionic acid, and fatty acids such as caproic acid, lauric acid, and myristic acid.

Since microemulsions are susceptible to microbiological contamination, a preservative may be required as an optional component of the microemulsion, and some representative compounds which can be used include formaldehyde, salicylic acid, phenoxyethanol, DMDM hydantoin (1,3-dimethylol-5,5-dimethyl hydantoin), 5-bromo-5-nitro-1,3-dioxane, methyl paraben, propyl paraben, sorbic acid, imidazolidinyl urea sold under the name GERMALL® II by Sutton Laboratories, Chatham, N.J., sodium benzoate, 5-chloro-2-methyl-4-isothiazolin-3-one sold under the name KATHON CG by Rohm & Haas Company, Philadelphia, Pa., and iodopropynl butyl carbamate sold under the name GLYCACIL® L by Lonza Incorporated, Fair Lawn, N.J.

A freeze/thaw stabilizer can be included as an optional component of the microemulsion including compounds such as ethylene glycol, propylene glycol, glycerol, trimethylene glycol, and polyoxyethylene ether alcohols such as RENEX 30 sold by ICI Surfactants, Wilmington, Del.

Another optional component of the microemulsion which can be included is a corrosion inhibitor such as an alkanolamine, an inorganic phosphate such as zinc dithiophosphate, an inorganic phosphonate, an inorganic nitrite such as sodium nitrite, a silicate, a siliconate, an alkyl phosphate amine, a succinic anhydride such as dodecenyl succinic anhydride, an amine succinate, or an alkaline earth sulfonate such as sodium sulfonate or calcium sulfonate.

The amount of each of the various components used in preparing microemulsions according to the invention, based on the total weight of the composition, are:

(i) 40–90 percent by weight of water, preferably 30–90 percent by weight;

(ii) 2–30 percent by weight of surfactant(s);

(iii) 10–60 percent by weight of the blend which includes the silicone oil component and the amine functional polysiloxane component, where the silicone oil component comprises 1–50 percent by weight and the amine functional polysiloxane component comprises 50–99 percent by weight;

(iv) 0.2–0.4 percent by weight of the carboxylic acid; and (v) 0.01–0.1 percent by weight of each optional component, i.e., preservative, freeze/thaw stabilizer, or corrosion inhibitor.

Such microemulsions can be prepared at room temperature using simple propeller mixers, turbine-type mixers, Brookfield counter-rotating mixers, or homogenizing mixers. No special equipment or processing conditions are generally required.

EXAMPLES

The following examples are set forth in order to illustrate this invention in more detail.

EXAMPLE 1

In this example, a transparent silicone oil-in-water microemulsion was prepared. Initially, a silicone blend was formed using a mechanical mixer to combine 150 gram of a 10 centistoke ($mm^2/s$) linear polydimethylsiloxane fluid, and 150 gram of an amine functional polysiloxane. The amine functional polysiloxane was a trimethylsiloxy terminated dimethyl/methylaminoethylaminoisobutyl siloxane copolymer with a viscosity of about 3,000 centistoke ($mm^2/s$), a DP of about 485, and a mol percent amine content of about 2.3 mol percent of aminoethylaminoisobutyl groups. A transparent silicone oil-in-water microemulsion formed by combining the various components in amounts as shown below.

| Component | Percent By Weight |
| --- | --- |
| Silicone Blend | 20.03 |
| SOFTANOL 50 Nonionic Surfactant | 4.06 |
| SOFTANOL 70 Nonionic Surfactant | 7.98 |
| Acetic Acid | 0.33 |
| GLYCACIL ® L Preservative | 0.10 |
| Phenoxyethanol Preservative | 0.90 |
| Water | 66.33 |
| Total | 100.00 |

The microemulsion was prepared with the mechanical mixer by first mixing the Silicone Blend, both SOFTANOL Nonionic Surfactants, and phenoxyethanol. To the mixture was added 8 percent of the total water, and mixing was continued. GLYCACIL® L and an additional 20 percent of the total water was added, and mixing was continued. The remaining 72 percent of water was added under continuous mixing. Finally, acetic acid was added, and the components were again mixed, and the resulting product was a transparent silicone oil-in-water microemulsion with particles having an average diameter of 5 nanometer (0.005 micron/50 angstrom Å)

EXAMPLE 2

Example 1 was repeated with the same results, except that the silicone blend was formed by combining 75 gram of the 10 centistoke ($mm^2/s$) linear polydimethylsiloxane fluid, and 225 gram of the amine functional polysiloxane.

Microemulsions prepared according to this invention are useful in paper coating, textile coating, and home care applications for delivering silicone polymers to various surfaces and substrates. They can also be used to deliver silicone polymers of tailored rheological properties to the human body, i.e., as in shampoo bases to provide styling and conditioning benefits to hair, or as a delivery mechanism for use in the care of skin.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of making a microemulsion comprising the steps of (i) forming a mixture comprising (a) water, (b) a nonionic surfactant, a cationic surfactant, an anionic surfactant, or a mixture of such surfactants, (c) a linear non-volatile polysiloxane, (d) an amine functional polysiloxane, and (e) a carboxylic acid; and (ii) mechanically mixing the mixture formed in (i) until a micromulsion is obtained containing polysiloxane particles having an average diameter of less than 50 nanometer (0.05 micron/500 angstro Å), the linear non-volatile polysiloxane (c) having the formula:

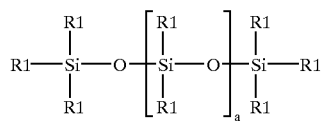

where R1 is an alkyl group containing 1–6 carbon atoms, and a represents an integer having a value greater than 5 and less than about 400.

2. A method according to claim 1 in which the mixture formed in (i) contains 40–90 percent by weight of water, 2–30 percent by weight of, surfactant(s), 10–60 percent by weight of the linear non-volatile polysiloxane and amine functional polysiloxane, and 0.2–0.4 percent by weight of carboxylic acid.

3. A method according to claim 1 in which R1 is methyl.

4. A method according to claim 1 in which the carboxylic acid is selected from the group consisting of acetic acid, proponic acid, caproic acid, lauric acid, and myristic acid.

5. A microemulsion prepared according to the method claimed in claim 1.

* * * * *